United States Patent [19]

Faust et al.

[11] Patent Number: 4,496,809
[45] Date of Patent: Jan. 29, 1985

[54] VIBRATION SENSITIVE TRIP SWITCH FOR VEHICLE ALARM SYSTEM OF THE LIKE

[75] Inventors: James H. Faust, Scottsdale, Ariz.; Michael J. Borch, Roselle, Ill.

[73] Assignee: A B C Auto Alarms, Inc., Elk Grove Village, Ill.

[21] Appl. No.: 542,735

[22] Filed: Oct. 17, 1983

[51] Int. Cl.³ .............................................. H01H 35/02
[52] U.S. Cl. ......................... 200/61.45 R; 200/61.48; 200/61.51; 200/61.52
[58] Field of Search ............... 200/61.45 R, 61.45 M, 200/61.46, 61.48, 61.52; 340/669, 670

[56] References Cited

U.S. PATENT DOCUMENTS

| | | | |
|---|---|---|---|
| 2,132,111 | 10/1938 | Honegger | 200/61.49 |
| 2,236,689 | 4/1941 | Lemire | 200/61.49 |
| 2,741,675 | 4/1956 | Chase et al. | 200/61.49 |
| 2,885,504 | 5/1959 | Yurtz | 200/61.51 X |
| 3,089,929 | 5/1963 | Murphy | 200/61.45 R |
| 3,175,059 | 3/1965 | Chesnut | 200/61.52 |
| 3,389,236 | 6/1968 | Guthart | 200/61.48 |
| 3,452,312 | 6/1969 | Bauer | 200/61.52 |
| 3,731,022 | 5/1973 | Loftus | 200/61.49 |
| 4,311,891 | 1/1982 | Faust | 200/61.45 R |
| 4,433,217 | 2/1984 | Griffith | 200/5 R |

FOREIGN PATENT DOCUMENTS

| | | | |
|---|---|---|---|
| 767868 | 7/1934 | France | 200/61.45 R |
| 1399971 | 4/1965 | France | 200/61.49 |
| 1391901 | 4/1975 | United Kingdom | 200/61.51 |

Primary Examiner—J. R. Scott
Attorney, Agent, or Firm—Silverman, Cass & Singer, Ltd.

[57] ABSTRACT

A vibration sensitive trip switch for a vehicle alarm system or the like comprising a pair of juxtaposed generally coextensive cantilevered flat clock springs spaced one above the other. Each cantilevered spring is secured to a bracket. The upper spring extends horizontally over the lower spring with the latter canted toward the free end of the overlying spring, terminating spaced a predetermined distance below same. The springs have facing contacts at their overlying free ends, with a fine gap defined therebetween. The springs are movable in an uninhibited manner at their free ends and are weighted unequally thereat, the underlying spring carrying a greater weight than the overlying spring. A shock pad is located immediately below the free end of the underlying spring. The overlying spring is sensitive to shock caused by sharp jars resulting from impact against the windows or tires as would occur during attempted theft or vandalism. The underlying spring functions as a motion detector responsive to the lifting of the vehicle or other forward and/or backward motion thereof. The springs are each warp and temperature resistant and hence, the alarm will not be sounded due to extreme temperatures or high wind gusts and ordinary occurrences.

25 Claims, 4 Drawing Figures

U.S. Patent   Jan. 29, 1985   4,496,809
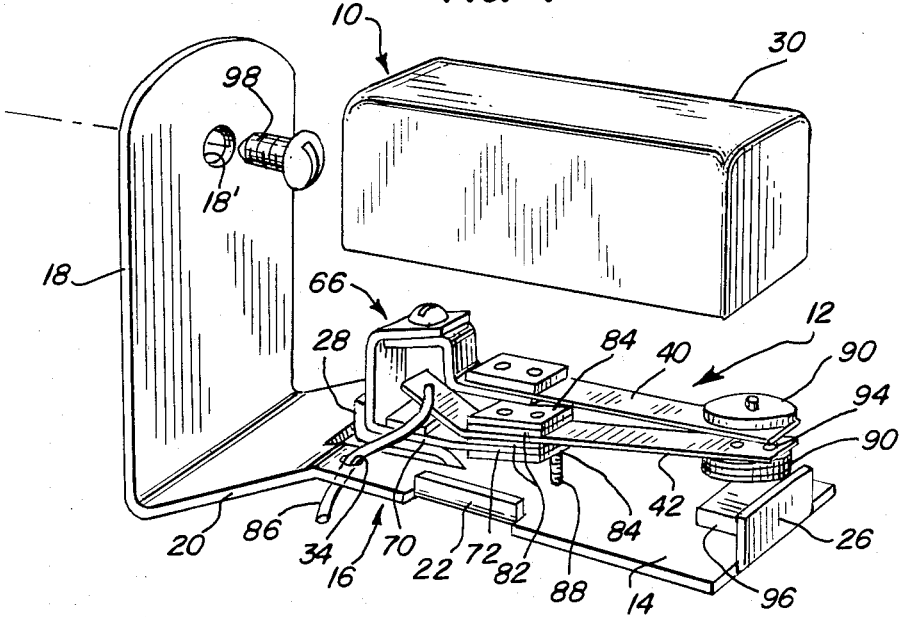
FIG. 1
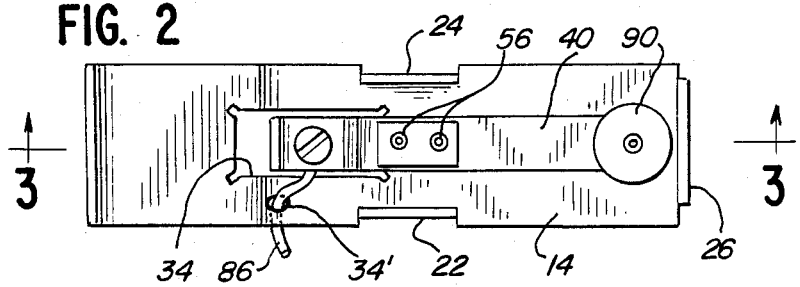
FIG. 2
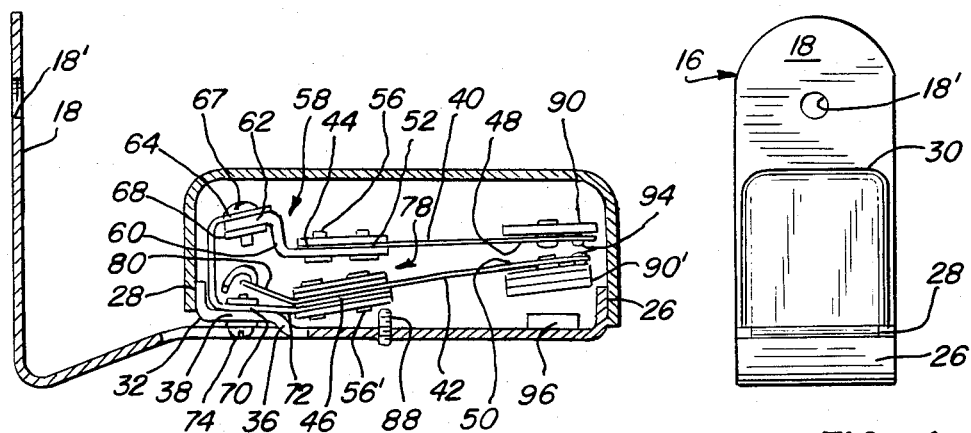
FIG. 3
FIG. 4

4,496,809

VIBRATION SENSITIVE TRIP SWITCH FOR VEHICLE ALARM SYSTEM OF THE LIKE

BACKGROUND OF THE INVENTION

This invention relates generally to vehicle theft alarms and more particularly, is directed to provision of vibration-sensitive trip switch means combining specific independent shock and motion responsive spring means whereby to effect predetermined insensitivity to shock and/or motion conventionally not associated with acts of theft or vandalism.

Vehicle alarm systems have become widely available to provide both audible and silent alarm in the event attempts are made to steal or otherwise tamper with a vehicle on which the alarm system operatively is installed.

One considerable disadvantage of available vehicle alarm systems is their undue sensitivity so as to sound due to other than theft, deliberate tampering, unauthorized motion etc. Often the alarm is tripped by reaction to minor shocks, strong wind gusts, heavy rain, hail, undue temperature sensitivity etc. Available trip switch means simply are too sensitive or not sufficiently sensitive.

Attempts to reduce the over-sensitivity of the alarm mechanism avoiding such accidental setting off of the alarm often have resulted in the alarm becoming insensitive to those intrusions primarily evidentiary of or preliminary to acts of theft or vandalism. For example, the skill of the vehicle thief has reached a level enabling access to be gained to the interior of a vehicle with very slight jarring impact, say upon a rear or side window as by using a thin flat bar to manipulate the locking device. Impact involved in breaking through a side window is sharp, most often brief and requires instantaneous response in energizing the alarm system. Alarms reactive to such occurrence often are also over-sensitive. Yet it is not feasible for the switch means to be also overly sensitive—so sensitive that a mere tap will set off the alarm.

Compromise is essential, yet available responsive means either are overly sensitive or not sufficiently sensitive. There are two distinct exigencies which demand specific responsive devices each functioning independently to detect a materially distinct event. For example, independent shock detectors and independent motion detectors are required. These detector units are materially different in their sensitivity and often require separate sensing means and trip means responsive respectively to the different exigencies. Each unit is provided with its own housing, mounting means and lead connections to be made to the alarm system.

Conventionally, spring biased trip switch means are provided with a sensitivity within a narrow range so as to detect, react and trip the alarm should a specific event occur. Often a rigid band spring is arranged to be flexed by the jarring, vibration or motion of the vehicle—a stationary contact disposed below same. The reaction of the spring effects an electrical connection to alarm means upon occurrence of the event.

Thin metal connector strips have a tendency to warp under the somewhat high temperatures encountered during operation of the vehicle or even under some other adverse environmental conditions. Extreme heat or cold effects the reactivity, i.e., bendability, flexibility, vibrational response, etc. Changes in thermal and/or electrical conductivities under different operating conditions often effect the sensitivity of the alarm switch means available presently.

Not only are problems encountered with the over and under sensitivity of available switch means. It is essential that the electrical connection established upon occurrence of the specific event be positive and brief. The electrical contacts must not stick together once the initial contact has been established. Normally, the spring bias of the flexible member is sufficient to open the tripped switch. Under extreme temperature conditions, the contacts have a tendency to retain their engagement. The springs may lose their resilience or the contact material may be softened so as to overcome the bias of the spring. The spring may become warped or twisted preventing its return to pretrip condition or even to prevent the contact from being made initially on the occurrence of the event.

Most alarm systems have time controls, delays, etc. so that once energized, the duration of the alarm, whether it be a siren, a personal or home beeper or a signal delivered to a monitoring agency such as a low enforcement unit, is limited. Further, once the system is deenergized after an event, as by a key operated means, continued engagement of the switch contact means would prevent deenergization with considerable damage to the system ensuing. Thus, instant-on instant-off characteristics are desirable.

SUMMARY OF THE INVENTION

An electrical trip switch for an electromechanical or electronic vehicle alarm system, said switch formed of a pair of cantilevered thin flat unequally weighted springs spaced apart one above the other and mounted for uninhibited free end movement on a support secured to a mounting bracket. The overlying spring is horizontally oriented while the underlying spring is directed from its location of securement to the bracket canted toward the overlying spring. The overlying spring vibrationally reacts only to sharp jars or similar shock transmitted by way a structural part of automobile frame while the underlying spring reacts only to the forward, backward or lifting motion of the automobile. Means are provided to adjust the sensitivity of the trip switch means by varying the gap distance.

BRIEF DESCRIPTION OF THE DRAWING

FIG. 1 is a partially exploded perspective view of the trip switch according to the invention;

FIG. 2 is a top plan view of the trip switch of FIG. 1;

FIG. 3 is a longitudinal sectional view of the trip switch according to the invention, and, FIG. 4 is a front end view of the trip switch according to the invention.

DESCRIPTION OF THE PREFERRED EMBODIMENT

As will be described hereinafter, the trip switch constructed according to the invention herein consists of a pair of juxtaposed like flat clock springs secured on the spaced arms of a mounting lug so that the overlying spring extends horizontally over the underlying spring, with the underlying spring extending canted toward the overlying spring to terminate proximate the free end of the overlying spring but spaced therefrom. Both springs are capable of free uninhibited motion at their free ends. Facing contacts are provided at the free ends of the springs, the underlying spring being insulated electrically from the mounting lug. The springs are unequally weighted at their free ends, the overlying spring carrying substantially less weight than the underlying spring. The upper spring functions as the shock detector while the underlying spring functions as the motion detector, respectively, of the trip switch. The mounting lug is carried by a mounting bracket itself adapted to be fixedly secured to the frame of the automobile, preferably to the firewall of the engine compartment, so that electrical lead means engaged with the underlying spring can establish electrical connection with the alarm system. The switch is provided with a housing cover and means are provided on the mounting bracket to retain the cover. The springs are temperature insensitive, very thin, do not warp under adverse extreme temperature condition and are very resilient.

Referring now to the drawing, in FIG. 1 the trip switch constructed in accordance with the invention herein is designated generally by reference 10 and comprises switch assembly 12 mounted on the flat 14 of bracket 16. The flat 14 of bracket 16 is joined to the upright 18 by unitary bend 20. Upright flanges 22, 23 and 26 are provided along the edges of the flat 14. Together with flange 28, flanges 22, 24 and 26 function as a retainer for the cover 30 which preferably is frictionally engaged over the switch assembly 12. Mounting support 32 is upset from a portion of the flat 14 leaving a passage 34 to accommodate an electrical lead therethrough, as will be explained. Mounting support 32 includes bend 36 connecting horizontal portion 38 to the flat 14, the free end of portion 38 terminating in upright flange 28.

The switch assembly 12 comprises a pair of elongate thin flat springs 40 and 42, preferably formed of clock spring metal material having a thickness of about 0.005 inches. The springs 40 and 42 are each weighted differently and are cantilever mounted at one end 44,46 respectively. They are capable of uninhibited movement at their opposite or free ends 48,50 respectively.

The spring 40 overlies spring 42 and is secured at its end 44 to clamp 52 by rivets 56, clamp 52 having an extension 58 integral therewith. Extension 58 includes connecting flange 60 and an angled tab 62. Angled tab 62 is secured to arm 64 of U-shaped mounting lug 66 by screw fastener 67 and retaining nut 68. Mounting lug 66 has a lower arm 70 provided with an upwardly angled extension 72. Lug 66 is secured to the arm 70 by screw fastener 74 and retaining nut 76. Clamp 78 is secured to the end of spring 42 at a location spaced inwardly of the bent end 80 thereof by rivets 56'. Clamp 78 consists of a pair of inner electrically insulating strips 82 and outer metal strips 84 respectively sandwiching the spring 42 electrically to isolate same. Electrical lead 86 is solder connected or welded onto the bent end 80 of spring 42 and directed through the passage 34, or if provided, through a small opening 34' formed in the flat 14.

The extension 72 is flexible slightly so that adjustment setscrew 88 threaded through the flat 14 below the free end of said extension 72 can bear against the underside of said extension 27 causing the free end 46 to be raised fractionally, or as the case may be, lowered, setting the gap distance between the free ends 48,50.

Weight 90 is secured to the upper surface of free end 48 of spring 40 while a weight 92 is secured to the under surface of free end 50 of spring 42, weight 92 being about three times the weight 90. The ratios of weight carried by the uppermost spring to the weight carried by the lowermost spring may range between 2.5:1 to 3.5:1 and preferably is 3:1. The weight members can comprise single units of different value or can be like members 90' of the same value secured to the appropriate spring ends in different numbers to provide the different weight values. The sensitivity of the switch assembly 10 can be changed.

Electrical contact buttons 94 are secured to facing surfaces of spring 40 and 42 in facing superposed relationship at locations adjacent the terminal edges of said springs. The gap distance between contact buttons 94 preferably range between 0.010 and 0.020 inches. The gap distance is not critical for the operation of the trip switch 10. A shock absorbing cushion or button 96 is secured to the flat 14 immediately below the free end 50 of spring 42 of resilient electrically insulating material to insulate the spring 42 and absorb any shock resulting from vibration thereof.

The overlying spring 40 is oriented in a horizontal direction extending over the underlying spring 42 and functions as a shock detector, reacting to sharp jars caused by the impact of break-in bar or other tool occasioned as by slapping of a hand or tool against a window or tire. The spring 40 will be insensitive to impact such as caused by driving rain or hail. On the other hand, underlying spring 42 functions as a motion detector, responding to forward and backward movement of the vehicle as well as to the lifting of the vehicle from either the front or rear ends thereof as would occur in the event the vehicle was raised for towing. The spring 42 is insensitive to rocking motion casually related to high wind gusts, for example. This blend of differential sensitivities provides the vehicle alarm system to which the trip switch 10 is coupled with the benefit of not sounding the alarm for minor or nontheft related events or tampering activities yet is sensitive sufficient to react to the occurrence of those activities against which the alarm is intended to protect.

The springs 40 and 42 are substantially identical and thin. They are not temperature sensitive, that is, will not bend, flex, twist or warp due to exposure to adverse extreme temperature conditions. The mounting bracket 16 preferably is secured to the firewall (not shown) of the engine compartment of a vehicle (not shown) by fastener 98 accommodated through passage 18' formed in upright 18 of bracket 16, whereat temperature conditions are extreme. Further, the facing contact buttons are biased apart by the springs' resilience even subsequent to momentary engagement due to sufficient vibration of one or both of the springs as a result of motion or shock detection. All that is required to trip the alarm switch and generate the warning is only a momentary contact. Once the alarm is energized and the alarm signal generated, conventional timing mechanisms are activated so that the duration of the generation of alarm is limited.

Once the trip switch has been assembled, the cover can be engaged thereover and sealed. The only adjustment which may be required may be the adjustment of the gap distance, adjusted by means of setscrew 88.

Thus, in summary, there has been described herein a combined motion and shock responsive trip switch means for a vehicle alarm which is sensitive to both select abnormal vehicular impact and motion while being insensitive to motion caused by natural elements such as wind, high temperatures, etc. The trip switch consists of a pair of like flat band springs arranged juxtaposed spaced apart, mounted at one of their ends, the upper spring being horizontally oriented while the lower spring is angularly oriented. The opposite ends of the springs are each freely movable, carrying contacts, one facing the other and spaced apart to define a fine gap. The said ends of the springs are weighted, the lower spring carrying at least twice the weight as the upper spring. The cant of the lower spring is adjustable to effect a fine determination of the gap. The shock, say occurring as a result of a substantive impact onto a window, will be transmitted via the frame to the upper spring which is caused to vibrate to make contact and cause the alarm system to sound. The trip switch is encased in a housing and mounted on a bracket attached to the frame of the vehicle, such as the fire wall within the engine compartment. Leads are provided for connection to an alarm apparatus.

Motion of the vehicle, such as effected by raising the vehicle by a jack, attempting to move the vehicle forward or backward and effecting unusual rocking of the vehicle will be transmitted to the lower spring, causing a vibration to which the lower spring reacts, the extent of the vibration being sufficient for the contacts momentarily to engage, closing the circuit and tripping the alarm. Only momentary contact is required to trip the alarm. Contact need not be maintained for the alarm to continue operation until a time lapse trigger or key turn-off is operated. Many variations of size, configuration and other minor charges can be effected without in any manner departing from the spirit and scope of the invention as defined in the claims appended hereto.

What we claim is:

1. A vibrationally responsive electrical trip switch for alarm systems adapted to be mounted on a structure casually related to selected events, said trip switch comprising first and second spring means, each formed as a flat, thin metal spring, mounting bracket means for securing said trip switch to said structure, support means secured on said mounting bracket means, said support means comprising an upset portion formed on said mounting bracket means, a U-shaped mounting lug secured to said upset portion, said mounting lug including upper and lower arms, said springs cantilever mounted on said support means in overlying relationship with their respective free ends capable of uninhibited movement and having a predetermined gap defined therebetween, the upper one of said springs being coupled to said upper arm and oriented in a horizontal direction, the lower one of said springs being coupled to said lower arm and oriented angularly in a direction leading toward the free end of said upper spring and terminating closely proximate thereto, electrical lead means secured to one of said springs and adapted to be electrically coupled to the alarm system, said springs being weighted unequally at said free ends, one of said springs being vibrationally sensitive to shock and the other one of said springs being vibrationally sensitive to translational motion respectively sufficient to establish electrical connection between their free ends upon the occurrence of such events.

2. The trip switch as claimed in claim 1 in which the lower spring is electrically insulated from said mounting lug and said electrical lead is connected to said lower spring.

3. The trip switch as claimed in claim 1 in which first and second unequal weights are secured to the respective free ends of said springs, the lower one of said springs carrying the heavier weight.

4. The trip switch as claimed in claim 3 in which the ratio of weight carried by said free ends of said overlying and underlying springs is from 1:2.5 to 1:3.5 respectively.

5. The trip switch as claimed in claim 3 in which a resilient cushion is disposed below the free end of the lowermost spring.

6. The trip switch as claimed in claim 3 and fastening means for securing said springs to said support bracket.

7. The trip switch as claimed in claim 6 wherein said fastening means comprise rivets.

8. The trip switch as claimed in claim 3 wherein said weights comprise discs.

9. The trip switch as claimed in claim 8 wherein said discs are riveted to said springs.

10. The trip switch as claimed in claim 8 in which said discs are unequal in weight.

11. The trip switch as claimed in claim 8 in which said discs are identical and there are more discs secured to the lower spring than to the upper spring.

12. The trip switch as claimed in claim 1 and means accessible from exterior of said switch in bearing relation against said lower arm of said mounting lug for selectively varying the gap distance between the free ends of said springs.

13. The trip switch as claimed in claim 12 in which said last mentioned means comprise a setscrew threadably mounted to said mounting bracket means.

14. The trip switch as claimed in claim 1 and cushion means disposed below the free end of the lower disposed spring.

15. The trip switch as claimed in claim 1 and a cover dish secured over the switch assembly.

16. The trip switch as claimed in claim 1 and a cover secured onto said mounting bracket means over the switch assembly.

17. The trip switch as claimed in claim 1 wherein said springs are formed of clock spring material.

18. The trip switch as claimed in claim 1 in which said springs are generally identical.

19. A combined motion and shock responsive trip switch for energizing a vehicle alarm system to its alarm state comprising a mounting bracket for securing said switch to a structure within the vehicle and including a flat portion, a switch assembly secured on said flat portion and a housing cover seated on said flat portion cover said switch assembly, said switch assembly comprising a pair of substantially identical flat spring members, generally U-configured support means for cantilever mounting said spring members one overlying the other in spaced superposed relationship and including a pair of overlying arms, the upper spring members secured to the upper one of said arms and oriented generally horizontally relative to said flat portion and the lower spring secured to the lower one of said arms and oriented in upwardly canted relationship leading toward the free end of the overlying spring to terminate proximate the free end but spaced a predetermined distance therefrom, said springs carrying facing electrical contact means defining a gap, the lower one of said springs being electrically insulated from said support means and electrical lead means being coupled to one of said springs and extending therefrom exterior of said housing cover, first and second weight means secured to said upper and lower springs on a surface thereof adjacent the free ends but opposite said contact means, said second weight means being at least twice as heavy as said first weight means, the free ends of said springs capable of free uninhibited movement responsive to vibrations casually related to selected events whereby to effect electrical connection to the alarm system upon occurrence of said events, the overlying spring being sensitive to vibrations arising from shock imparted to the vehicle while the underlying spring being sensitive to vibrations arising from forward, backward or lifting motion of said vehicle.

20. The trip switch as claimed in claim 19 in which there are means provided for varying the sensitivities of said springs by varying the gap distance between said contact means operatively from the exterior of said housing cover.

21. The trip switch as claimed in claim 19 in which there are means provided by varying the sensitivities of said springs by varying the weight carried by the respective spring ends.

22. The trip switch as claimed in claim 19 in which the lower spring carries about three times the weight carried by the uppermost spring.

23. A vibrationally responsive electrical trip switch for a vehicle alarm system, said trip switch comprising a pair of overlying, cantilever mounted, angularly related, thin, flat, unequally weighted, springs spaced apart, first and second juxtaposed spaced mounting arms, means securing said springs to said arms at adjacent respective ends for directing said springs in respective first and second planes with their free ends disposed spaced a precise distance, said second plane being below and canted toward said first plane, electrical contact means secured to facing surfaces of said first and second springs defining a precise gap therebetween, means for establishing electrical connection to at least one of said springs by way of one of said arms, the heavier weighted spring functioning only as a motion detector and the lighter weighted spring functioning only as a shock detector.

24. The trip switch as claimed in claim 23 and adjustable means bearing upon the lower arm to vary the gap distance between said contacts at the free ends of said springs whereby to adjust the sensitivity of said trip switch.

25. A vibrationally responsive electrical trip switch for alarm systems adapted to be secured to a structure casually related to selected events, said trip switch comprising first and second overlying cantilever mounted leaf springs, support mounting means for said springs, the respective free ends of said springs being capable of uninhibited movement and having a predetermined gap defined therebetween, mounting means comprising a mounting lug including upper and lower arms oriented in juxtaposed converging planes, one of said springs being coupled to said upper arm for orientation in a generally horizontal direction and the other one of said springs being coupled to said lower arm for orientation in a direction toward the free end of said one spring and terminating closely proximate thereto to define said gap, electrical lead means secured to one of said springs and adapted to be electrically coupled to the alarm system, said springs being weighted unequally at said free ends, one of said springs being vibrationally sensitive to shock and the other one of said springs being vibrationally sensitive to translational motion respectively sufficient to establish electrical connection between their free ends upon the occurrence of such events.

* * * * *